J. McK. MICHAELSON.
COMBINED TRAIN PIPE COUPLING AND VALVE.
APPLICATION FILED APR. 23, 1909.
1,013,418.
Patented Jan. 2, 1912.
2 SHEETS—SHEET 1.
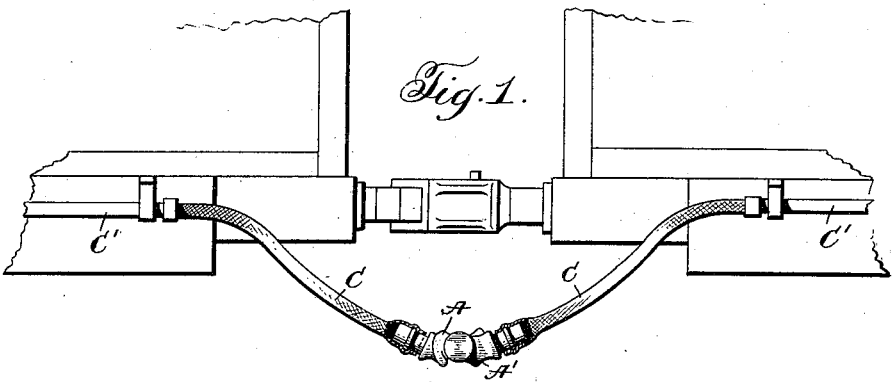
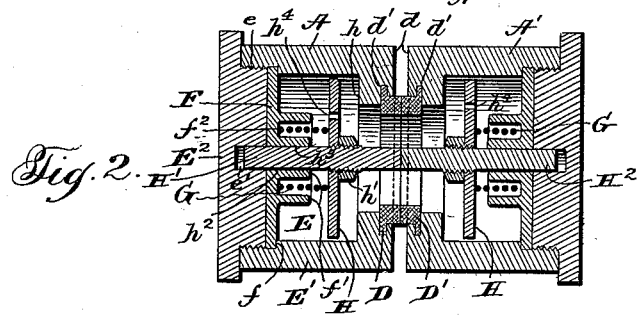
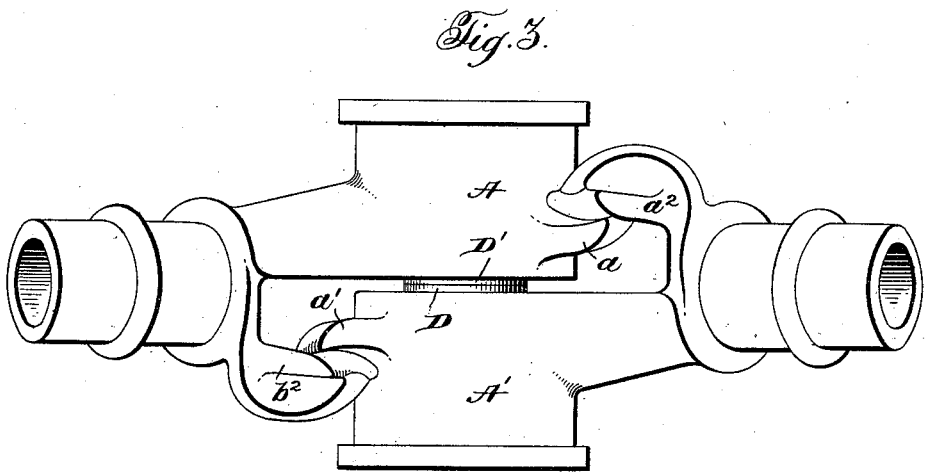
Witnesses:
Jas E Hutchinson
Carrie A. Krey
Inventor:
James McK. Michaelson,
By  Attorneys

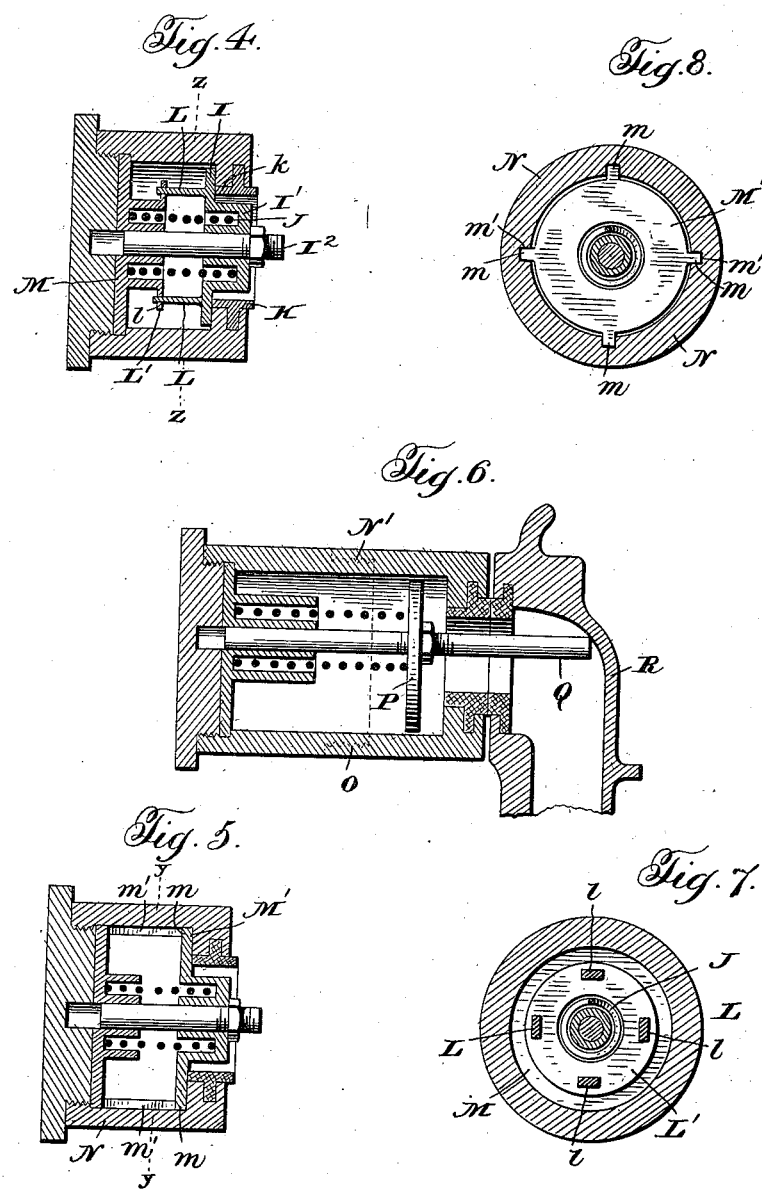

UNITED STATES PATENT OFFICE.

JAMES McKENZIE MICHAELSON, OF GENEVA, NEW YORK, ASSIGNOR OF ONE-FOURTH TO J. R. WERTMAN AND THREE-FOURTHS TO ADAM McK. MICHAELSON, OF GENEVA, NEW YORK.

COMBINED TRAIN-PIPE COUPLING AND VALVE.

1,013,418.  Specification of Letters Patent.  Patented Jan. 2, 1912.

Application filed April 23, 1909. Serial No. 491,717.

*To all whom it may concern:*

Be it known that I, JAMES MCKENZIE MICHAELSON, a citizen of the United States, residing at Geneva, in the county of Ontario and State of New York, have invented certain new and useful Improvements in Combined Train Pipe Couplings and Valves, of which the following is a specification, reference being had therein to the accompanying drawing.

This invention relates to improvements in air brake systems, and has for its primary object the provision of a novel combined coupling and valve designed to increase the efficiency of a system of the character stated.

The invention comprehends the provision of improvements, enabling parts now commonly employed in the standard systems to be dispensed with, among which may be mentioned the usual angle cocks or valves, or the valves ordinarily employed at points removed from the train pipe couplings.

The invention also comprehends the provision of an automatically actuatable valve located at the point of coupling between the air pipes on adjoining cars of a train pipe, and more particularly the formation of said valve in connection with or as a part attached to the member or members of a twin coupling. To those skilled in the art the function of the coöperating twin coupling members is perfectly clear, the same being employed, one at the end of each flexible hose extension leading from the train pipes and adapted to engage to form an air passage throughout the train when the cars thereof are in their normal coupled position, but to automatically separate should adjoining cars become uncoupled.

In the use of the present more common or standardized systems, the above referred to angle cocks or valves arranged at points removed from the air pipe coupling are utilized manually to close the ends of disconnected pipes. However, owing to the length of the flexible hose extensions, a considerable amount of air is permitted to escape, such amount depending upon the distance of the angle cocks or valves from the coupling, and this is disadvantageous, not only by reason of the escape of the compressed air as an incident to the customary coupling or uncoupling operation, but also because of the fact that in the accidental breaking apart or separation of adjoining cars, the reduction of the air pressure of the systems affects the operation of the brakes, too much by the volume of the escaping air, rather than by the sudden escape of the steam. It is of course a well-recognized fact that the effective operation of the brakes in a fluid pressure system depends more largely upon the sudden reduction of pressure, rather than upon a heavy reduction of the same. In the use of my improvements, it is obvious that the desired sudden reduction will instantaneously take place upon the uncoupling of the compressed air pipe, and that no relatively large volume of compressed air is allowed to escape, owing to the location of the valves directly at the point of uncoupling.

The invention also embraces a construction of valve mechanism which may be supplied in connection with new couplings or which may with great facility be installed in couplings now in use; also such a formation of the operating parts which will interfere to no extent whatever with the ordinary coupling and uncoupling of the air pipes; and further an arrangement whereby the valves in the usual twin couplings, or the valve in one coupling member when coupled with a valveless coöperating member, will be opened to constitute a continuous passageway throughout adjoining cars, simply by the usual coupling of the air pipe extensions together.

The invention still further embraces a combined coupling and valve of the character herein alluded to, provided with means enabling the interior construction to be readily inspected, adjusted, repaired, removed or installed at will; and preferably without the necessity for the employment of special tools or mechanism to that end.

All of the foregoing, together with other novel features in the details of construction and arrangement of parts of structures made in keeping with my present invention, will be apparent from the detailed description hereinafter contained, when read in connection with the accompanying drawings forming part hereof and wherein several convenient embodiments of the invention are illustrated.

In the drawings: Figure 1 is a side elevation showing a pair of ordinary flexible hose extensions leading from the adjacent ends of compressed air train pipes, the said extensions being separably connected together through the medium of twin coupling members of a standard type. Fig. 2 is a longitudinal section of one form of the invention showing the two members of the coupling in their coupled position. Fig. 3 is a plan view of the coupling as shown in Fig. 1, Fig. 4 is a sectional view of a detached coupling member showing a slightly modified arrangement of the associated parts of the valve structure, Fig. 5 is a similar view showing another slightly modified structure, Fig. 6 is also a similar view illustrating a still further embodiment of the invention, and Figs. 7 and 8 are respectively transverse sections on the lines $y$—$y$ and $z$—$z$ of Figs. 5 and 4.

Referring more specifically to the drawings wherein like reference characters designate corresponding parts in the several views, A, $A^1$ represent complementary or twin coupling members of standard or approved style, the specific interlocking of which need not be specifically referred to herein further than to state that they are provided with the usual flanges $a$, $a^1$ and overlapping cam surfaces $a^2$, $b^2$ adapted to remain in coupled condition when occupying the position shown in Fig. 1, from which it will be noted that the coupling is carried by and suspended with the usual flexible hose extensions C projecting from the train pipes $C^1$, but which will automatically uncouple should the cars separate and the flexible extensions drawn into alinement or taut. Now with particular reference to Figs. 1, 2 and 3, (and in this connection a description of one of the coupling members will suffice for both), it will be seen that near the inner or engaging face $d$ of the coupling member the same is formed with the usual annular interior groove $d^1$ for the packing ring D projecting outwardly beyond the surface $d$ to engage similar packing $D^1$ on the opposing coupling member. The main portion of the member is hollow, as at E, surrounded by a tubular portion $E^1$ closed at its end by a threaded cap $E^2$ engaging an interior thread $e$ formed in the tubular portion E. Secured between the inner surface of the cap $E^2$ and an annular shoulder $f$ on the member $E^1$ is a combined guide and spring seat F, the same having inwardly projecting concentric circular flanges $f^1$ forming therebetween a spring seat and guide $f^2$, the spring being represented at G and projecting inwardly for a substantial extent toward the inner face of the coupling member where said spring abuts against a disk-like valve or diaphragm H seating against a valve seat $h$. This valve or diaphragm is carried by a stem $H^1$ secured thereto through the medium of a thread and nut connection $h^1$ whereby the valve and its stem may be shifted together. One end of this valve stem extends into the tubular portion $h^2$ of the combined guide and seat F and is adapted when the spring G is compressed, to pass through an aperture $h^3$ therein and into a recessed portion $e^1$ in the cap $F^2$. The opposite end of the valve stem projects inwardly a substantial distance beyond the inner face of the coupling member whereby to engage the correspondingly projected portion of the valve stem $H^2$ on the opposite coupling member when the parts are secured in normal or operating condition. This normal or operating condition is illustrated quite clearly in Fig. 2 from which it will be observed that the valve stems have mutually thrust each other into the coupling members as an incident to the engagement of said members together, thus forcing the valves or diaphragms H away from their seats $h$ against the expansive or seating action of the springs G. Thus the air passage through the coupling is continuous and will be preserved until the parts are uncoupled, whether by accident or purposely. When uncoupled, it is clear that the valve or diaphragm H will be instantly pressed to its seat $h$ and the air passage closed or obstructed there by this operation taking place in both of the coupling members. Should it be found desirable to provide for a somewhat gradual relief of the air pressure, a small aperture $h^4$ may be formed in the valve or diaphragm H.

The form of the device illustrated in Figs. 4 and 7 is in the main quite similar to that just above described. In the present structure, however, the valve represented at I has a hollow interior spring seat $I^1$ for the upper end of the outwardly thrusting spring J, and the inner or seating face of the valve or diaphragm engages a downwardly projecting flange $k$ on the packing ring K. In this form further provision is also made to overcome any rocking tendency of the valve and its stem, the latter being shown at $I^1$, said provision consisting of outwardly projecting guide fingers L adapted to pass through openings $l$ in a guide plate $L^1$, formed with or secured to and projecting outwardly from the outer combined bearing and guide for the spring and guide for the valve stem, represented at M. Any convenient number of guide fingers L and corresponding openings $l$ may be used.

In Figs. 5 and 8, the valve or diaphragm $M^1$ is shown as being prevented from interior wabbling or rocking by a series of lugs $m$ projecting from the periphery thereof and adapted to travel back and forth in grooves $m^1$ formed therefor in the cylindrical portion N of the coupling member.

Referring now to Fig. 6, we have shown therein a coupling member provided with my valve attachment, the arrangement being such that the valve will be opened as an incident to the connecting of the coupling members together, whether or not the opposite or opposing coupling member is provided with a similar valve arrangement. In this embodiment of the invention, the cylindrical portion of the coupling member is represented at N¹, the same being initially formed somewhat elongated relative to the devices heretofore discussed, or by having a cup-shaped cap secured to the relatively shallow coupling member as indicated in dotted lines at O. The wide range of play or movement of the valve or diaphragm P in this form of device, enables a much longer extension Q on the valve stem. This long extension may, when the coupling members are brought together, contact either with the inner surface of the wall of the opposite coupling member (shown at R) when said opposite member is valveless, or it may contact with the surface of the valve P when said member is provided with a similar valve. To enable this mutual engagement of the extensions Q with the opposite valves or diaphragms P, the valve stems in this instance are arranged off-center as shown, to permit the extensions to overlap each other rather than contact at their ends, as in the forms of devices otherwise shown in the drawings.

From the foregoing, it will be appreciated that I have furnished a simple, efficient combined coupling and valve of the character stated, one which will dispense with parts now required in the standard systems, one which will insure greater efficiency in the operation of air brake systems; one which will not impair the usual coupling and uncoupling functions of the coupling members by which the valves are carried; and a device in which the valves are automatically set to open the air passageway as an incident to the connecting of the coupling members together; and also a device which may be readily attached or removed, easily inspected and repaired, and which is applicable to either new couplings or couplings already in use.

I claim:—

1. A train pipe coupling head having a side port and a valve seat, a removable valve within the coupling adapted to coöperate with the seat, a valve stem on which the valve is mounted, a removable cap threaded into the head opposite the seat, and of a diameter to permit the removal of the valve when the cap is removed, a stem support and guide adjacent the cap secured in position thereby and having an elongated bearing for the stem, and a spring surrounding the guide and abutting the valve, substantially as described.

2. A train pipe coupling head having a side port and a valve seat, a removable valve and an opening opposite the seat of a diameter to permit the removal of the valve therethrough, a cap for closing said opening, a valve stem on which the valve is adjustably mounted, a valve stem support and guide adjacent the cap and held in place thereby, and a spring on the guide abutting the valve.

In testimony whereof I affix my signature in presence of two witnesses.

JAMES McKENZIE MICHAELSON.

Witnesses:
J. M. MARGNER,
S. F. PERSONS.

---

Copies of this patent may be obtained for five cents each, by addressing the "Commissioner of Patents, Washington, D. C."